(12) United States Patent
Krisher

(10) Patent No.: US 6,176,359 B1
(45) Date of Patent: Jan. 23, 2001

(54) BI-DIRECTIONAL OVERRUNNING CLUTCH

(75) Inventor: James A. Krisher, Fort Wayne, IN (US)

(73) Assignee: Dana Corporation, Toledo, OH (US)

( * ) Notice: Under 35 U.S.C. 154(b), the term of this patent shall be extended for 0 days.

(21) Appl. No.: 09/293,070

(22) Filed: Apr. 16, 1999

(51) Int. Cl.$^7$ .................................................... F16D 41/10
(52) U.S. Cl. ............................................. 192/43.1; 74/650
(58) Field of Search ................................ 192/43.1, 69.1, 192/48.92, 39; 74/650; 180/249

(56) References Cited

U.S. PATENT DOCUMENTS

| | | |
|---|---|---|
| 1,236,222 | 8/1917 | Spain et al. . |
| 1,320,773 | 11/1919 | Luxmore . |
| 2,664,766 | 1/1954 | Schmal . |
| 3,200,919 | 8/1965 | Lanigan et al. . |
| 4,667,767 * | 5/1987 | Shea et al. .......................... 192/44 X |
| 4,782,720 | 11/1988 | Teraoka et al. . |
| 5,738,604 * | 4/1998 | Dick ................................. 180/249 X |
| 5,927,455 * | 7/1999 | Baker et al. .................... 192/43.1 X |
| 5,937,980 * | 8/1999 | Dick .................................... 192/43.1 |
| 5,967,277 * | 10/1999 | Walter ................................. 192/43.1 |
| 5,971,123 * | 10/1999 | Ochab et al. ....................... 74/650 X |

* cited by examiner

*Primary Examiner*—Rodney H. Bonck
(74) *Attorney, Agent, or Firm*—Oldham & Oldham Co., L.P.A.

(57) ABSTRACT

A bi-directional overrunning clutch assembly which can be used for example, in a powertrain design including a transfer case with front & rear outputs mechanically connected (no differential or in-line torque coupling), a primary axle of conventional design, and a secondary axle assembly with a unique differential assembly of which the bidirectional overrunning clutch assembly is a component thereof. The unique differential assembly utilizes two one-way bidirectional clutch assemblies which provide for axle shaft differentiation while turning, include speed-sensing limited-slip capability, and eliminate the necessity for an interaxle differential or in-line torque coupling device in the transfer case. Each clutch assembly includes two sets of struts. Each set of struts is used to transmit torque in one direction. A laterally sliding decoupler is utilized to control which set of struts is functional. The decoupler moves only when the one-way clutch rotating direction is reversed. A reversing ring is used to move the decouplers and allow the one-way clutches to function in both directions. The reversing ring is adapted to sense the direction of rotation of the differential case. As the case begins to rotate in the 'forward' direction, a drag force is created that rotates the reversing ring. This angular movement of the reversing ring is translated to linear movement for the decouplers. As the decouplers are repositioned, both one-way clutches are reoriented to function in the 'forward' mode. When the differential case begins to rotate in the 'reverse' direction, the reversing ring rotates angularly in the opposite direction. This angular movement of the reversing ring results in linear movement of the decouplers, which reverses the orientation of both one-way clutches.

23 Claims, 6 Drawing Sheets

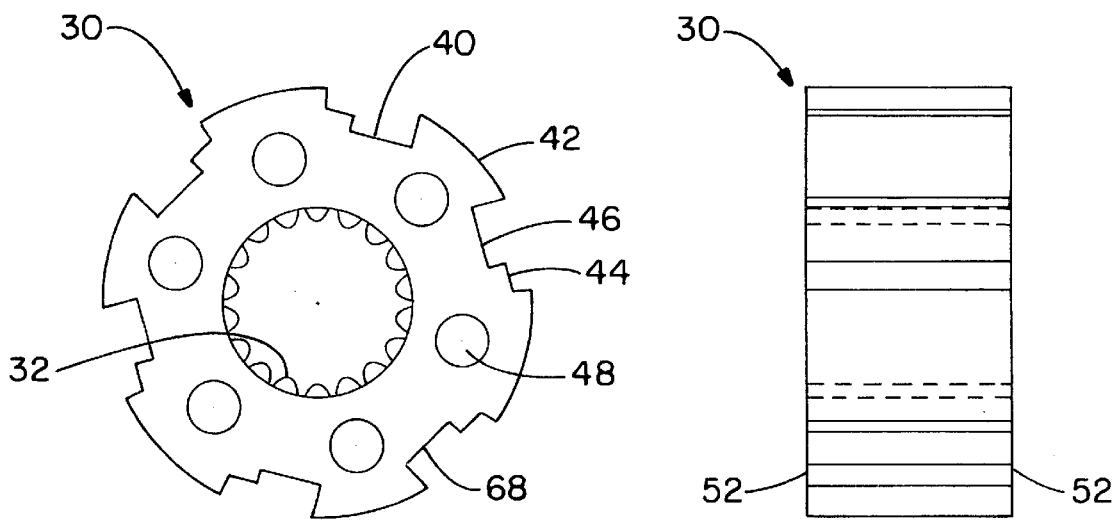
FIG.-4
FIG.-5
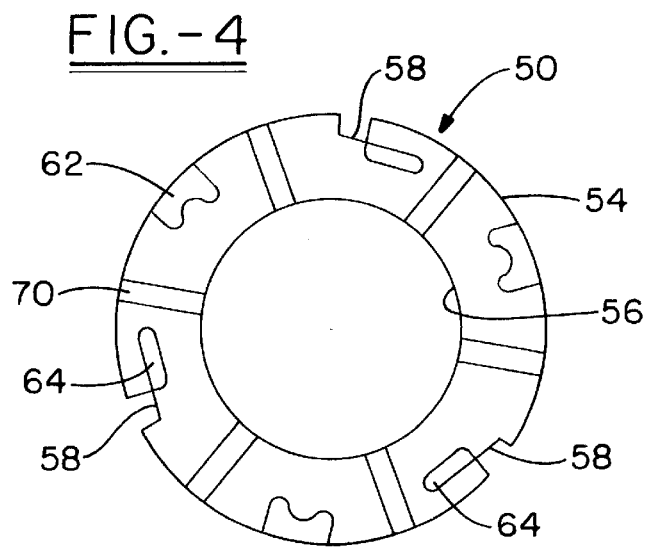
FIG.-6
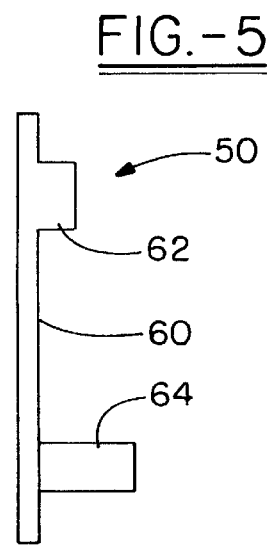
FIG.-7
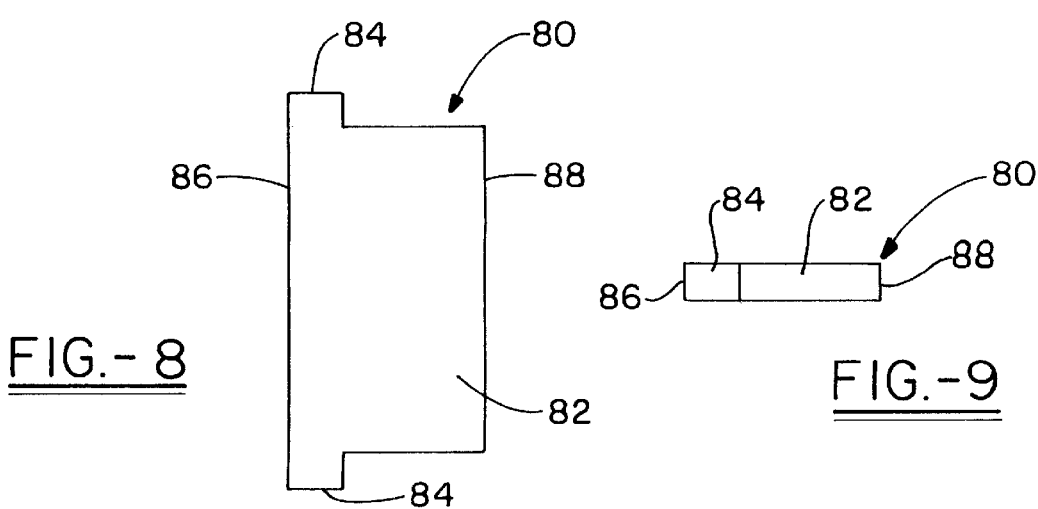
FIG.-8
FIG.-9

BI-DIRECTIONAL OVERRUNNING CLUTCH

TECHNICAL FIELD

The present invention relates generally to a bi-directional overrunning clutch assembly. More particularly, the present invention relates to a bi-directional overrunning clutch assembly which can be used, for example, as an "on-demand" torque transmitting device in an all-wheel drive motor vehicle.

BACKGROUND OF THE INVENTION

Four-wheel drive motor vehicles are becoming increasingly popular. Recently, certain motor vehicles have been provided with "full-time" four-wheel drive systems also known as all-wheel drive systems. In such all-wheel drive systems, the torque transfer cases are typically provided with an interaxle differential for dividing torque between the front and rear wheels of the motor vehicle. The interaxle differential enables the front wheels and the rear wheels to rotate at different speeds, during normal turning of the motor vehicle or in the event that the front wheels and the rear wheels have tires with different diameters. However, to prevent excessive relative slipping between the front wheels and the rear wheels, as might occur when one set of wheels encounters a low-traction condition, such as ice, these transfer cases typically include a selectively engageable clutch which is operative to lock the interaxle differential upon sensing a predetermined amount of relative slippage between the front output shaft and the rear output shaft of the transfer case. Locking of the interaxle differential prevents any further relative overrun or differentiation between the front output shaft and the rear output shaft of the transfer case.

Known prior all-wheel drive systems have generally required complex electronic sensors or other complex systems to monitor the overrun or differentiation between the transfer case front and rear output shafts or the front wheels and the rear wheels of a motor vehicle. Upon sensing relative overrun or differentiation, an electronic control system determines whether the relative overrun or differentiation being encountered is within a "normal" expected range or is "excessive." If the electronic control system indicates that the overrun or differentiation being experienced is "excessive," the electronic control system causes the clutch to lock the interaxle differential to preclude any further relative overrun or differentiation. An electronic control system of this type can be expensive to manufacture and maintain and a more cost-effective, simplified "on demand" system of limiting more than a predetermined amount of overrun or differentiation between the front wheels and the rear wheels of the motor vehicle would be desirable.

In recent years, motor vehicle all-wheel drive power-train systems have been cost-reduced by eliminating the transfer case differential, providing continuous power to a primary axle, and providing on-demand power to the secondary axle whenever primary axle slippage occurs. Typically, a torque-coupling device (viscous, hydraulic, electric) is utilized within the transfer case to drive the secondary axle. The torque-coupling device compensates for any speed difference which may occur between the primary and secondary axle. When the secondary axle is a front axle, an open differential is typically installed. Torque-sensing differentials with clutch pack pre-load are not considered acceptable for front axles due to steering issues attributable to torque bias. The front wheels tend to slide rather than turn on low coefficient-of-friction surfaces.

One prior art vehicle is offered with a speed-sensing, limited slip front axle differential to eliminate the pre-load torque bias issue. However, this design still requires an interaxle differential or in-line torque coupling to avoid driveline wind-up when operated on hard pavement.

It would therefore be desirable to provide a simplified, cost effective mechanism to allow differentiation between front and rear output-shafts in an all-wheel drive system, while providing speed-sensing limited-slip capabilities.

SUMMARY OF THE INVENTION

The present invention is, therefore, directed to a speed-sensing, limited-slip transfer case including a differential assembly which overcomes the delinquency of the prior art. The invention is also directed to a bidirectional overrunning clutch assembly which may be used in such a system or in any other power transmitting device. In a preferred embodiment, there is provided a transfer case with front & rear outputs mechanically connected, a primary axle assembly and a secondary axle assembly comprising a differential assembly including at least one bidirectional overrunning clutch assembly. In the preferred form, the clutch assembly includes two sets of struts, each set used to transmit torque in one direction. A decoupler is utilized to control which set of struts is functional. The decoupler may be a laterally sliding component capable of preventing one set of struts from engaging the outer race of the differential case. As the decoupler moves laterally, one set of struts is engaged, then neither set are engaged, then the other set becomes engaged. The decoupler may be designed to move only when the one-way clutch rotating direction is reversed. A reversing ring may be used to move the decoupler and allow the one-way clutches to function in both directions. In a preferred form, the reversing ring includes a 'paddle wheel' feature. As the differential case begins to rotate in the 'forward' or 'reverse' directions, the 'paddle wheel' contacts the axle lubricant, creating a drag force that rotates the reversing ring. This angular movement of the reversing ring is translated to linear movement of the decoupler. As the decoupler is repositioned, the one-way clutch is reoriented to function in the 'forward' or 'reverse' mode. In the preferred embodiment, two clutch assemblies are used, each clutch assembly providing power to one output shaft. When the vehicle turns, the outboard wheel & shaft speed increases, over-running the corresponding clutch assembly. All drive torque is transmitted through the inboard wheel. If the inboard wheel should lose traction and slip during a turn, the differential case speed increases until it matches the outboard wheel speed. When the speeds are equivalent, the outboard wheel begins transmitting torque; the one-way clutch prevents the differential case from over-speeding the shaft and wheel. This provides the limited-slip feature desired for increased mobility. To avoid driveline wind-up while driving on hard pavement, the primary & secondary axles are preferably geared with slightly different ratios. The secondary axle differential case rotates slightly slower than the corresponding wheels resulting in a wheel over-run condition and no torque transmission. When a primary axle wheel begins to slip, the secondary axle differential case speed increases until at least one of the one-way clutches engages and transmits torque. The amount of primary axle wheel slippage required to engage the secondary axle is dependent upon the gear ratio difference.

Accordingly, it is an object of the present invention to provide a speed-sensing, limited slip axle assembly for an all-wheel drive vehicle and bidirectional overrunning clutch assembly therefore. A differential assembly according to a preferred embodiment includes two one-way bidirectional overrunning clutch assemblies which provide for axle shaft differentiation while turning, and speed-sensing limited-slip capability, while eliminating the necessity for an interaxle differential or in-line torque coupling device in the transfer case.

Other advantages and novel features of the present invention will become apparent in the following detailed description of the invention when considered in conjunction with the accompanying drawings.

BRIEF DESCRIPTION OF THE DRAWINGS

FIGS. 4 and 5 are front and side views of a sidegear of the one-way bi-directional overrunning clutch assembly in accordance with the preferred embodiment;

FIGS. 6 and 7 are front and side views of a thrustwasher of the one-way bi-directional overrunning clutch assembly in accordance with the preferred embodiment;

FIGS. 8 and 9 are front and side views of a strut of the one-way bi-directional overrunning clutch assembly in accordance with the preferred embodiment;

DETAILED DESCRIPTION OF THE DRAWINGS

Figure 1:
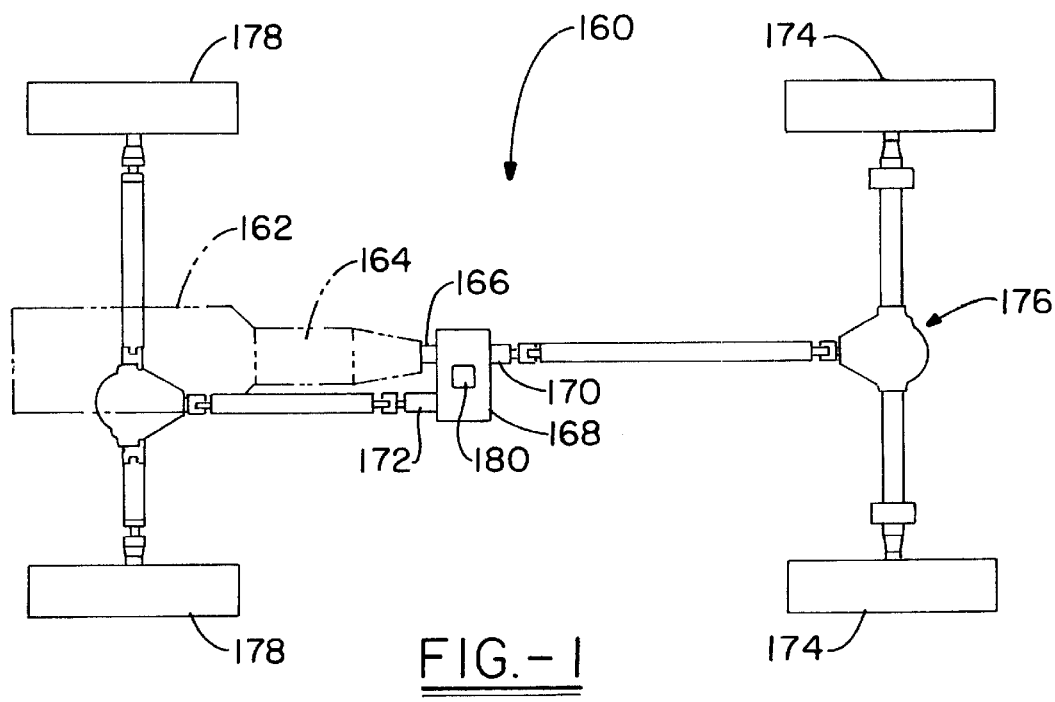
FIG. 1 is a top plan view of a vehicle powertrain of the present invention.

In the following detailed description of preferred embodiments of the present invention, reference is made to the accompanying drawings which, in conjunction with this detailed description, illustrate and describe an axle assembly 10 and bi-directional overrunning clutch assembly, generally identified by reference number 20. Referring now to the drawings, in which like-referenced characters indicate corresponding elements throughout the several views, attention is first directed to FIG. 1, where an all wheel drive vehicle powertrain 160 is shown. The vehicle powertrain 160 comprises an engine 162, drivingly connected to a transmission 164. The transmission 164, is drivingly connected to an input shaft 166 of the transfer case 168. The transfer case 168 includes a rear output shaft 170 and a front output shaft 172 which are mechanically connected through the transfer case 168 (no differential or in-line torque coupling). The transfer case 168 is also shown with an axle disconnect 180 of a type known in the art which is used in an alternate embodiment of the invention to convert the vehicle powertrain 160 to 4×2 mode by disconnecting the front output shaft 172. As herein shown, the rear output shaft 170 is drivingly connected to the vehicle rear wheels 174 through a first axle assembly 176 of a known type. As herein shown, the front output shaft 172 is drivingly connected to the vehicle front wheels 178 through a second axle assembly 10 having a speed-sensing limited-slip differential assembly 11 which provides both interaxle and intraaxle differentiation. In the preferred embodiment, the second axle assembly 10 may be coupled to the front output shaft 172, but it is also contemplated as an alternate embodiment that the first axle assembly 176 could be coupled to the front output shaft 172 and the second axle assembly 10 connected to the rear output shaft 170.

Figure 2:
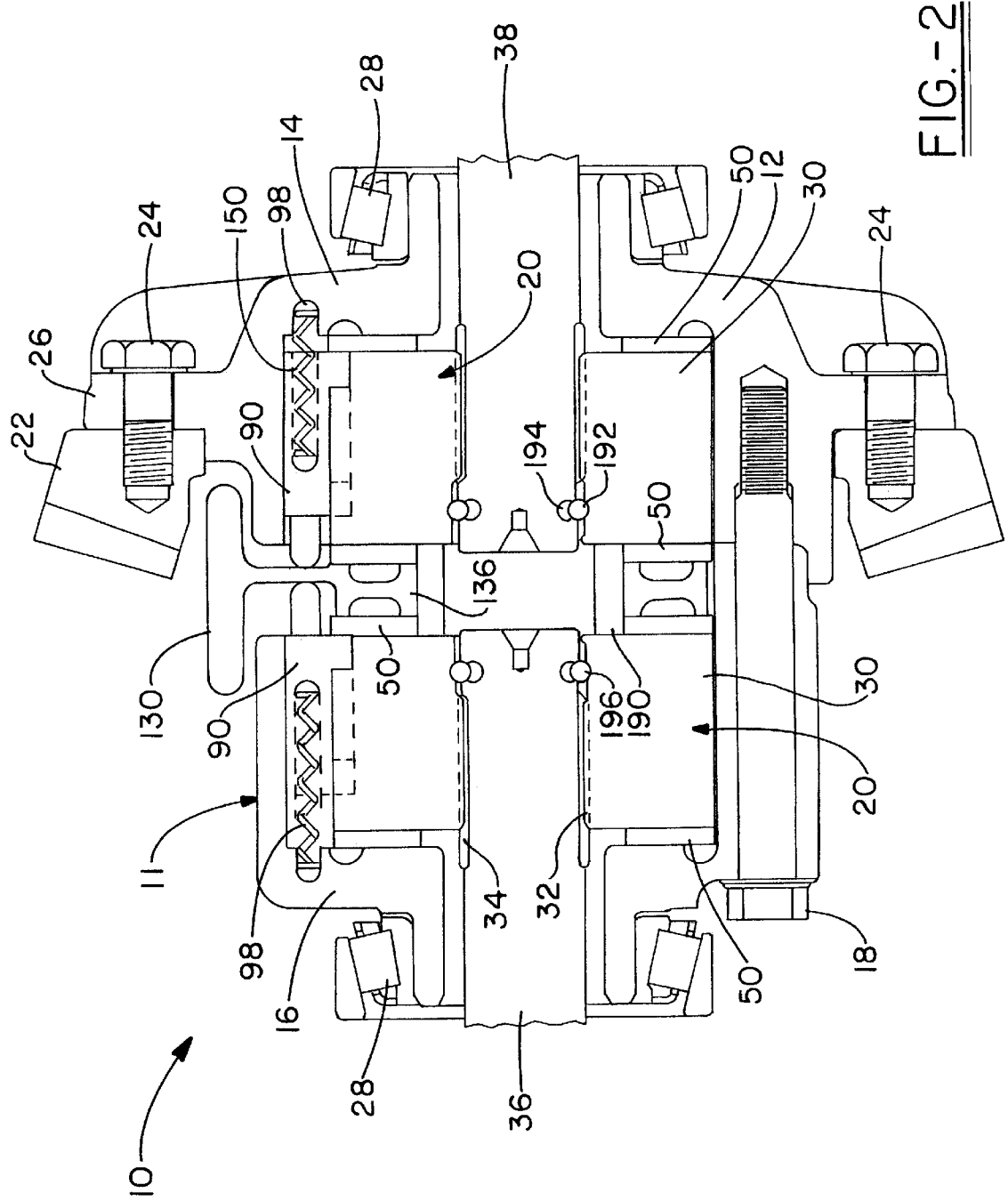
FIG. 2 is a cross-sectional side view of an axle assembly utilizing two one-way bi-directional overrunning clutch assemblies in accordance with a preferred embodiment of the present invention.

Referring now to FIG. 2, the axle assembly 10 has a differential assembly 11 comprising a case 12 and at least one one-way bi-directional overrunning clutch assembly 20. In the preferred embodiment, two clutch assemblies 20 are provided. The case 12 preferably comprises a right side half 14 and a left side half 16 which are attached together with bolts 18. One of the halves has a flange 26 extending therefrom to which a ring gear 22 is attached using bolts 24. The ring gear 22 is drivingly connected to the front output shaft (not shown) through a drive pinion (not shown). Each end of the case 12 is supported by tapered roller bearings 28 such that the case is freely rotatable.

Figure 3:
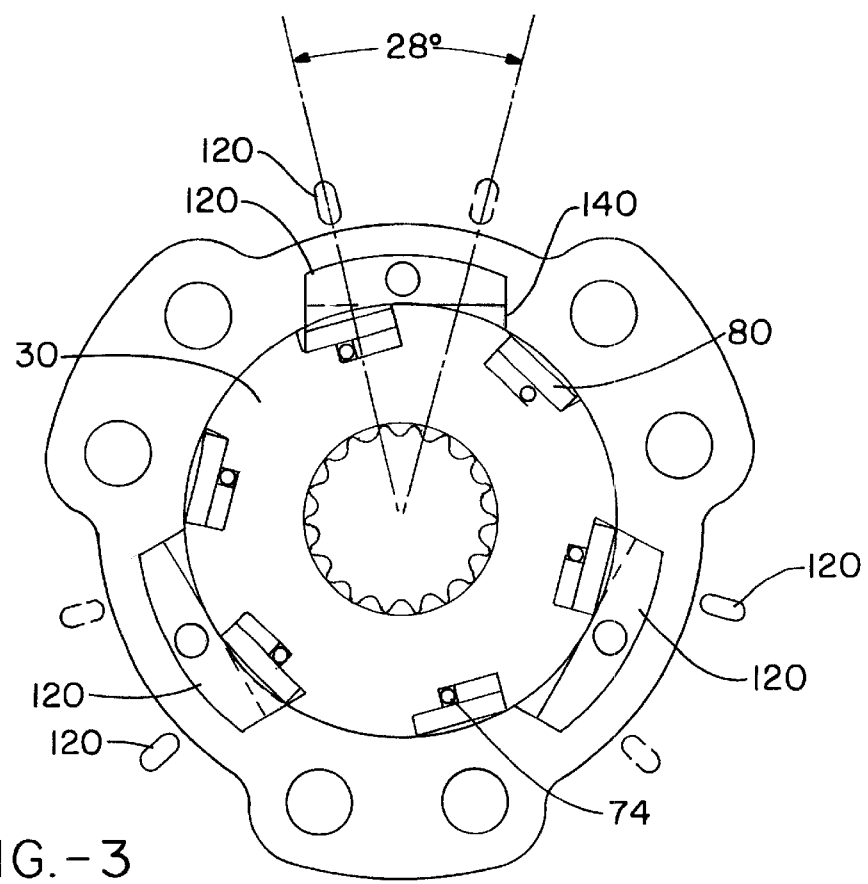
FIG. 3 is a crossectional view of the axle assembly of FIG. 2 taken along line 3—3 showing a one-way bidirectional overrunning clutch assembly.
Figure 19:
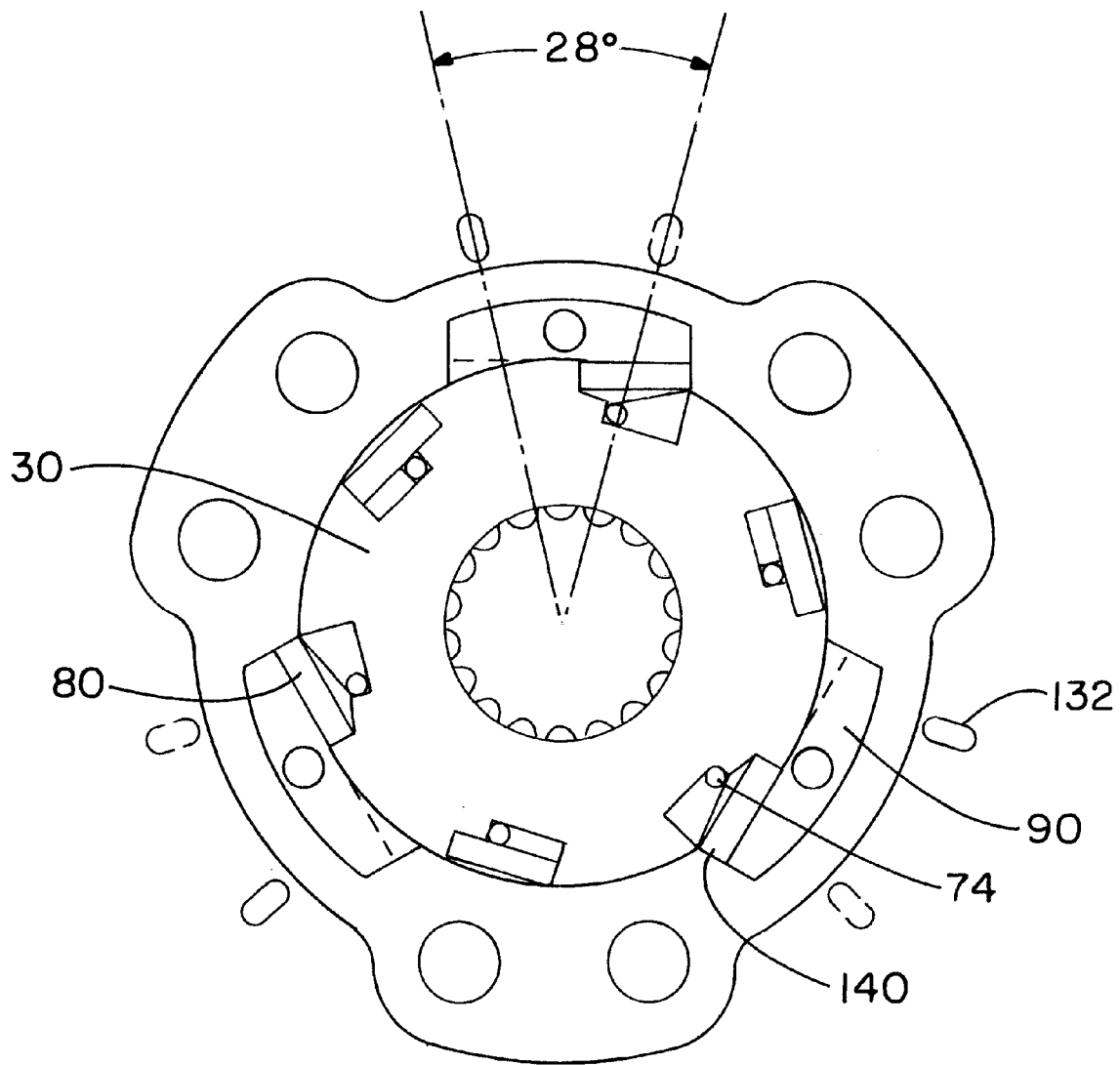
FIG. 19 is a crossectional view of the axle assembly similar to FIG. 3 showing an engaged one-way bi-directional overrunning clutch assembly in accordance with the preferred embodiment of the present invention shown in FIG. 2.

Each clutch assembly 20 comprises a sidegear 30. Each sidegear 30 preferably is a disk with a splined inside diameter 32 which drivingly engage corresponding splines 34 on the outside diameter of the left axle shaft 36 or the right axle shaft 38. The axle shafts 36, 38 in turn drive the wheels (not shown) of the vehicle (not shown), and in the preferred embodiment, the front wheels. When used in a front wheel application, the axle shafts 36, 38 are retained within the sidegear 30 by a retaining ring 192. The retaining ring 192 is compressed into a slot 194 cut into the end of the axle shafts 36, 38 and expands into a slot 196 machined into the inside diameter 32 of the sidegear 30. As best shown in FIGS. 3, 4 and 19, the side gear 30 has six spaced stepped slots 40 cut into the surface of its outer diameter 42. In the preferred embodiment, six slots 40 are provided. Each of the slots 40 have a first, shallow slot portion 44 and a second, larger and deeper slot portion 46. The slots 40 are configured such that each slot has its shallow side 44 and deep side 46 in opposite orientation compared to the slot immediately to its left and right. Between the slots 40 and the inner diameter 32 and outer diameter 42, the sidegear 30 preferably has a number of lightening holes 48 to reduce the weight of the sidegear 30. The sidegears 30 are separated by a thrust ring 190 which provides a reaction path when either axle 36, 38 is loaded axially.

Each clutch assembly 20 preferably further comprises two thrustwashers 50 which attach to the disk faces 52 of the sidegear 30. As best shown in FIGS. 6 and 7, the preferred thrustwasher 50 is a thin disk having an outside diameter 54 of the same general size as the outside diameter 42 of the sidegear 30. The inside diameter 56 of the thrustwasher 48 is larger than that of the sidegear 30, providing clearance for the thrust collar 190. Spaced small slots 58 are cut into the outside diameter 54 surface which are designed to correspond in size to the shallow slot portion 44 of the slots 40 on the sidegear 30. The thrustwasher 50 has an inboard disk face 60 which attaches to the disk face 52 of the sidegear 30. In the preferred embodiment, three slots 58 are provided on each thrustwasher 50. Three short projections 62 and three long projections 64 extend perpendicularly from the inboard disk face 60 of the thrustwasher 50. The projections 62, 64 are preferably spaced radially about the inboard disk face 60 and interspersed (long 64, short 62, long 64, . . . ) thereabout to correspond to the slots 40 on the side gear 30. The long projections 64 may comprise a generally rectangular cross-section with rounded corners which is positioned offset below the small slot 58 such that it lies on the bottom surface 68 of the larger deeper slot portion 46 of the slots 40 when placed on the sidegear 30. The long projections 64 however, are dimensioned to extend over only about half the width of the sidegear 30. The short projections 62 extend from the outside diameter 54 surface radially inward and generally in an irregularly shaped "w". When attached to the sidegear 30, the short projection 62 only extends a short distance of the width of the sidegear 30 however, over such distance it generally fills the larger deeper slot portion 46 of the slots 40. The thrustwasher 50 also has spaced oil channels 70 cut into the surface of the inboard disk face 60, shown as six equally spaced channels 70. The channels 70 extend radially from the inside diameter 56 to the outside diameter 54 of the thrustwasher 50.

Figure 15:
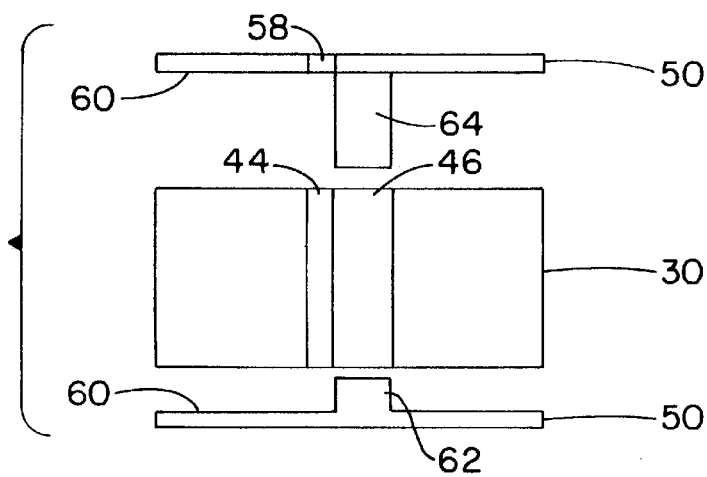
FIG. 15 is an exploded side view of a portion of the sidegear and thrustwashers of the one-way bi-directional overrunning clutch assembly thereof in accordance with the preferred embodiment.
Figure 16:
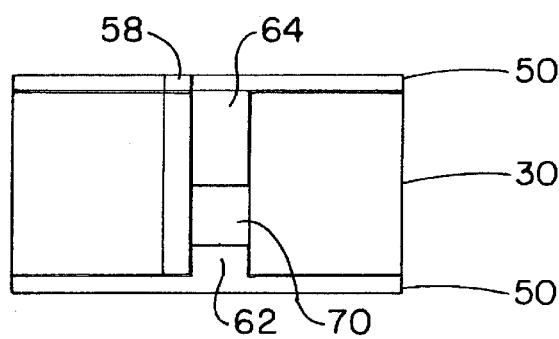
FIG. 16 is a side view of a portion of the sidegear and thrustwashers of the one-way bi-directional overrunning clutch assembly as assembled in accordance with the preferred embodiment.
Figure 17:
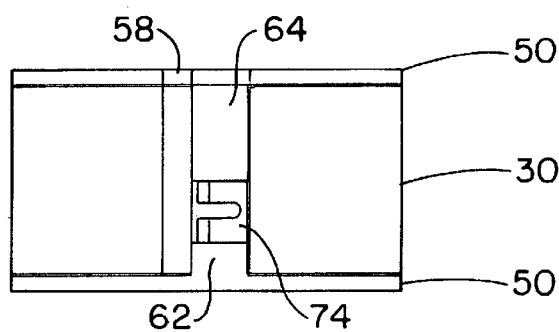
FIG. 17 is a side view of a portion of the sidegear, thrustwashers and biaser of the one-way bi-directional overrunning clutch assembly as assembled in accordance with the preferred embodiment.
Figure 18:
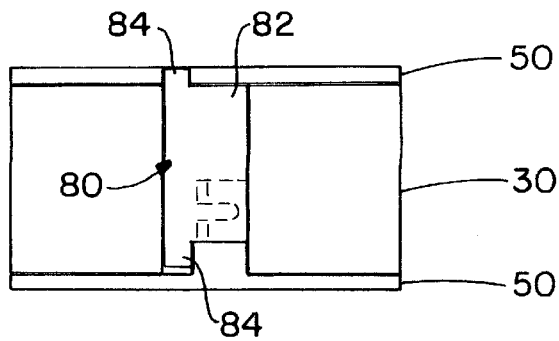
FIG. 18 is a side view of a portion of the sidegear, thrustwashers, biaser and strut of the one-way bi-directional overrunning clutch assembly as assembled in accordance with the preferred embodiment.

The two thrustwashers 50 are preferably mounted on the sidegear 30 such that the long projections 64 of one thrustwasher 50 face the short projections 62 of the other thrustwasher as best shown in FIG. 15. This creates an un-filled gap 72 in the deeper slot portion 46 of the sidegear slots 40 as shown in FIG. 16. A biaser 74 is placed into the gap 72 as shown in FIG. 17 and covered by a strut 80 as shown in FIG. 18. The strut 80 is generally a rectangular block body 82 with tabs 84 extending therefrom on the opposite shorter sides of the rectangular block body 82 as best shown in FIGS. 8 and 9. The body 82 extends over smaller slot portion 44, the larger slot portion 46, over the biaser 74, and the long projection 64 of the thrustwasher 50 as shown in FIG. 18. One tab 84 fits into the small slot 58 of the thrustwasher on one side and the other tab 84 extends partially along the side of the short projection 62. The tabbed end 86 of the strut acts as a pivot while the biaser 74 is positioned such that it elevates the non-tabbed end 88 of the strut 80 when the strut 80 is not held down.

Figure 10:
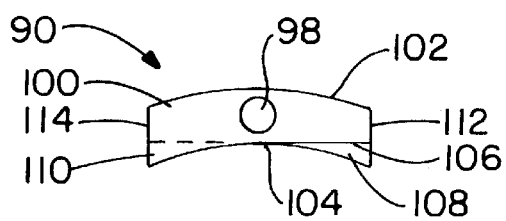
FIGS. 10–12 are front, side and top views of a decoupler of the one-way bi-directional overrunning clutch assembly in accordance with the preferred embodiment.
Figure 11:
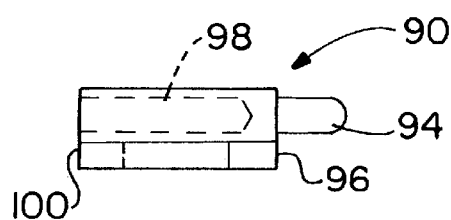
Figure 12:
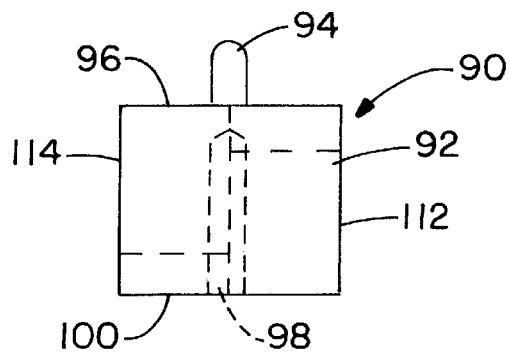
Figure 13:
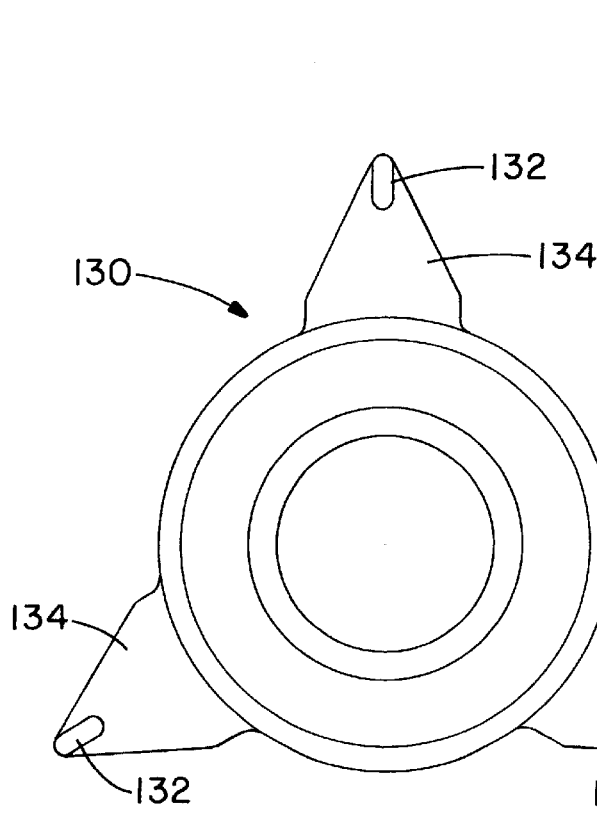
FIGS. 13 and 14 are front and side views of a reversing ring of the one-way bi-directional overrunning clutch assembly in accordance with the preferred embodiment.
Figure 14:
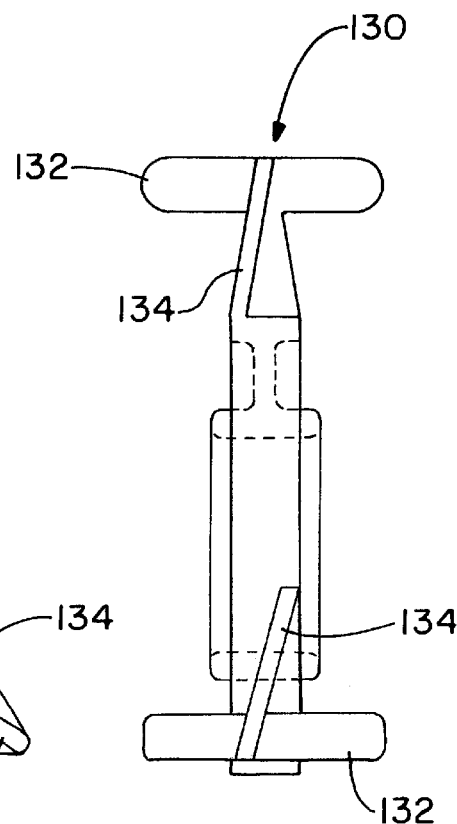

The different orientations of the slots 40 result in two sets of three struts 80 in the preferred embodiment. Each set of struts 80 is used to transmit torque in one direction. A decoupler 90 is preferably utilized to control which set of struts 80 is functional. The decoupler 90 is a laterally sliding component capable of preventing one set of struts 80 from engaging an outer race 140 formed by the interior wall of the case 12 where it forms a housing for the decoupler 90. As the decoupler 90 moves laterally, one set of struts 80 is engaged, then neither set are engaged, then the other set becomes engaged. The decoupler 90 moves only when the differential assembly 11 rotating direction is reversed. Referring now to FIGS. 10–12, the decoupler 90 preferably comprises a body 92 and a reversing ring engagement pin 94 extending perpendicularly from the inboard end 96 of the body 92. The body 92 has a biaser housing hole 98 extending perpendicularly from the outboard side 100 of the body 92. The housing hole 98 is preferably in-line with the reversing ring engagement pin 94. The body 92 has a continuously curved upper surface 102 which mates with a decoupler housing formed in the interior of the case 12. The bottom surface 104 of the body 92 comprises a generally flat portion 106, a curved portion 108 on the inboard side 96 of the bottom surface 104 and a curved portion 110 on an outboard side 100 of the bottom surface 104. The curved portions 108, 110 extend in opposite directions from the centerline of the body 92 to the right side 112 and left side 114 of the body 92 respectively, forming a curved surface which is generally parallel to curved upper surface 98. On the opposite side of the body centerline from the curved portions 108, 110 the bottom surface 104 is flat.

A reversing mechanism 120 is required to permit the one-way clutches 20 to function in both directions. This mechanism 120 preferably consists of three decouplers 90 per one-way clutch assembly 20, and a reversing ring 130. The reversing ring 130 preferably includes a 'paddle wheel' feature 132 shown in FIGS. 2, 3,13 and 14. As the case 12 begins to rotate in the 'forward' direction, the paddle wheel 132 contacts the axle lubricant, creating a drag force that rotates the reversing ring 130 approximately 28 degrees. The reversing of the case 12 rotation causes the case 12 to rotate in the opposite direction from which the clutch 20 is rotating. This reversal disengages any struts 80 which may be engaging an outer race 140. The disengagement is due to the strut 80 rotating from the engagement position along the flat bottom surface 106 of the decoupler 90 (now rotating in the opposite direction) to the curved portion 108 or 110 on the opposite side of the decoupler centerline which forces the non-tabbed side 88 of the strut 80 down toward the sidegear 50. The arms 134 of the paddle wheel 132 are angled such that the angular movement of the reversing ring 130 is translated to linear movement for the decouplers 90. The decouplers 90 are biased toward the surface of the reversing ring arms 134 by biasers 150 such that the engagement pin 94 of the decoupler 90 is in direct contact with the surface of the arms 134. The rotation of the reversing ring 130 causes the decouplers on both sides of the case 12 to be pushed laterally in one direction. As the decouplers 90 are repositioned, both one-way clutches 20 are reoriented to function in the 'forward' mode. More specifically, the other set of three struts 80 are engaged due to the positioning of the flat portion 106 of the decoupler bottom surface 104 completely over the other set of struts 80, allowing the strut biaser 74 to elevate the non-tabbed side 88 of the strut against the outer race 140. When the case 12 begins to rotate in the 'reverse' direction, the reversing ring 130 rotates angularly in the opposite direction. This angular movement of the reversing ring 130 results in linear movement of the decouplers 90, which reverses the orientation of both one-way clutches 20. The reversing ring 130 has a hub portion 136 at its center which has an inside diameter generally the same size as the inside diameter of the thruswashers 50, both of which encircle the smaller diameter of the thrust ring 190, enabling the reversing ring 130 to rotate freely.

To avoid driveline wind-up while driving on hard pavement, the first 176 and second axle 10 of the vehicle powertrain 160 are preferably geared with slightly different ratios. In the preferred embodiment, the second axle 10 including the clutch assembly 20 is positioned to drive the front wheels 178, wherein the axle differential case 11 will be geared to rotate slightly slower than the corresponding wheels 178 resulting in a wheel over-run condition and no torque transmission. When a wheel associated with the first axle 176 begins to slip, the second axle differential case 11 speed increases until at least one of the one-way clutches 20 engages and transmits torque. The amount of primary axle wheel slippage required to engage the secondary axle 10 is preferably dependent upon the gear ratio difference, and can be adjusted for various applications or environments.

In an alternate embodiment, the secondary axle assembly 10 can also be utilized in 4×2 mode to optimize fuel economy by utilizing a transfer case 12 with a disconnect 180 for the axle 10. To avoid secondary axle differential and gearset rotation in 4×2 mode, most vehicles currently use wheel hublocks or axle shaft disconnects which are both well known in the art. The one-way clutch over-running feature effectively simulates wheel hublocks, with none of the supporting control systems or hardware required.

In another alternate embodiment, this proposed design could also be used as a limited-slip primary axle. Although an axle assembly used in such an application would lack engine braking, as the wheels would over-run the differential case, the limited-slip capabilities would be provided in a simple and cost-effective construction.

Although the present invention has been described above in detail, the same is by way of illustration and example only and is not to be taken as a limitation on the present invention. For example, the number struts 80 and their arrangement could be readily changed to fabricate a suitable one-way bi-directional overrunning clutch assembly 20 using the teachings of the present invention. Additionally the clutch of the present invention may be used in any power-transmitting device and is not limited to use in a differential assembly. Accordingly, the scope and content of the present invention are to be defined only by the terms of the appended claims.

What is claimed is:

1. An all wheel drive motor vehicle powertrain comprising;
   an engine;
   a transmission connected to said engine;
   an input shaft rotatably powered by said engine through said transmission;
   a transfer case receiving said input shaft;
   a front output shaft and a rear output shaft rotatably powered through said transfer case;
   a first axle assembly drivingly connected to one of said output shafts;
   a second axle assembly drivingly connected to the other said output shaft;
   wherein said front output shaft and said rear output shaft are mechanically connected through the transfer case in that both of said output shafts rotate at the same speed;
   wherein said second axle assembly comprises a speed-sensing, limited-slip differential assembly providing interaxle and intraaxle differentiation; and
   wherein said speed-sensing, limited-slip differential assembly comprises at least one bi-directional overrunning clutch assembly and a reversing mechanism adapted to automatically respond to a change in directional rotation of the differential case and permit said at least one clutch assembly to function in both directions.

2. The all wheel drive motor vehicle powertrain of claim 1, wherein said second axle assembly is drivingly connected to a pair of vehicle rear wheels.

3. The motor vehicle powertrain of claim 1, wherein said first axle assembly and said second axle assembly are geared with different ratios.

4. The motor vehicle powertrain of claim 1, wherein said second axle assembly is drivingly connected to a pair of vehicle front wheels.

5. The motor vehicle powertrain of claim 4, wherein said differential assembly is geared to rotate slower than the vehicle front wheels creating an overrun condition.

6. The motor vehicle powertrain of claim 1, wherein said transfer case includes a disconnect for the second axle assembly for operation in 4×2 mode.

7. The motor vehicle powertrain of claim 1, wherein said clutch assembly comprises at least one strut oriented to transmit torque in one direction and at least one other strut oriented to transmit torque in an opposite direction; and
   wherein said reversing mechanism comprises a reversing ring adapted to laterally move at least one decoupler which actuates and de-actuates said struts.

8. If A speed-sensing, limited-slip differential assembly comprising;
   a ring gear;
   a rotatable differential case connected to said ring gear;
   at least one output shaft extending from said differential case;
   at least one one-way bi-directional overrunning clutch assembly;
   a reversing mechanism adapted to respond to a change in directional rotation of the differential case and permit said at least one clutch assembly to function in both directions;
   wherein said at least one clutch assembly is drivingly connected to said at least one output shaft;
   wherein said at least one clutch assembly is automatically actuated in response to a rotational speed differential between said differential case and said at least one output shaft; and
   wherein said clutch assembly comprises at least one strut oriented to transmit torque in one direction and at least one other strut oriented to transmit torque in an opposite direction.

9. The speed-sensing, limited-slip differential assembly of claim 8, wherein said reversing mechanism comprises at least one reversing ring and at least one decoupler which actuates and de-actuates the struts.

10. The speed-sensing, limited-slip differential assembly of claims 9, wherein said reversing ring comprises at least one paddle wheel portion which rotates said reversing ring relative to said differential case in response to a change in direction of rotation of the differential case.

11. The speed-sensing, limited-slip differential assembly of claim 10, wherein said reversing ring further comprises an arm extending at an angle toward said paddle wheel portion, wherein said arm is engaged by said decoupler such that the rotation of said reversing ring results in lateral movement of said decoupler which actuates and de-actuates said struts to reverse the orientation of said clutch assembly.

12. The speed-sensing, limited-slip differential assembly of claimed 9, wherein said reversing ring is adapted to automatically rotate relative to said differential case in response to a change in direction of rotation of the differential case.

13. The speed-sensing, limited-slip differential assembly of claimed 9, wherein said reversing ring comprises a portion extending radially outwardly at a predetermined angle from a hub thereof, wherein said extending portion is engaged by said decoupler such that said rotation of said reversing ring in relation to said case results in lateral movement of said decoupler which actuates and de-actuates the struts to reverse the orientation of the clutch assembly.

14. The speed-sensing, limited-slip differential assembly of claim 8, wherein said differential case rotates at a speed in relation to said at least one output shaft such that drive torque is transmitted when their rotational speeds are equal.

15. The speed-sensing, limited-slip differential assembly of claim 8, wherein said at least one one-way bi-directional overrunning clutch assembly prevents the differential case from rotating at a speed faster than said at least one output shaft.

16. The speed-sensing, limited-slip differential assembly of claim 8, wherein said reversing mechanism comprises at least one decoupler biased against a portion of a reversing ring such that movement of said reversing ring relative to said case moves said at least one decoupler which actuates and de-actuates the struts.

17. A bi-directional overrunning clutch assembly comprising;
   a sidegear drivingly connected to an output shaft along an interior diameter thereof;
   sat least one strut oriented to transmit torque in one direction and at least one other strut oriented to transmit torque in an opposite direction; and
   a reversing mechanism permitting operation in both directions, said reversing mechanism comprising a reversing ring adapted to causing lateral movement of at least one decoupler which actuates and de-actuates the struts.

18. The bi-directional overrunning clutch assembly of claim 17, wherein said reversing ring comprises at least one paddle wheel portion which rotates said reversing ring in response to a change in direction of rotation of a housing member.

19. The bi-directional overrunning clutch assembly of claim 18, wherein said reversing ring further comprises an arm extending at an angle toward said paddle wheel portion, wherein said arm is engaged by said decoupler such that the rotation of said reversing ring results in lateral movement of said decoupler which actuates and de-actuates said struts to reverse the orientation of said clutch assembly.

20. The bi-directional overrunning clutch assembly of claim 17, wherein said side gear comprises slots along an outside diameter surface thereof which house said struts and a biaser which enables an end of said struts to drivingly engage an outer race of a housing member.

21. The bi-directional overrunning clutch assembly of claim 17, wherein said reversing ring comprises a portion extending radially outwardly at a predetermined angle from a hub thereof, which rotates relative to a housing member in response to a change in direction of rotation of said housing member.

22. The bi-directional overrunning clutch assembly of claim 17, wherein said extending portion of said reversing ring is engaged by said decoupler such that said rotation of said reversing ring results in lateral movement of said decoupler which actuates and de-actuates the struts to reverse the orientation of the clutch assembly.

23. A bi-directional overrunning clutch assembly comprising;
   a sidegear drivingly connected to an output shaft;
   at least one strut oriented to transmit torque in one direction and at least one other strut oriented to transmit torque in an opposite direction; and
   a reversing mechanism permitting operation in both directions, wherein said reversing mechanism comprises at least one decoupler which moves laterally in relation to said sidegear to actuate and de-actuate said struts.

* * * * *